US012463375B2

(12) United States Patent
Ebata et al.

(10) Patent No.: US 12,463,375 B2
(45) Date of Patent: Nov. 4, 2025

(54) WIRING MEMBER INCLUDING A CONNECTOR HOUSING CONTAINING A FILLING MEMBER

(71) Applicants: Sumitomo Wiring Systems, Ltd., Mie (JP); TOYOTA JIDOSHA KABUSHIKI KAISHA, Aichi (JP)

(72) Inventors: Daisuke Ebata, Mie (JP); Takuya Kaba, Mie (JP); Masaki Mizushita, Mie (JP); Tetsuya Nishimura, Mie (JP); Yusuke Mitani, Mie (JP); Itsuo Wakabayashi, Aichi (JP)

(73) Assignees: SUMITOMO WIRING SYSTEMS, LTD., Mie (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 301 days.

(21) Appl. No.: 18/028,306

(22) PCT Filed: Sep. 17, 2021

(86) PCT No.: PCT/JP2021/034353

§ 371 (c)(1),
(2) Date: Mar. 24, 2023

(87) PCT Pub. No.: WO2022/075045

PCT Pub. Date: Apr. 14, 2022

(65) Prior Publication Data

US 2023/0378684 A1 Nov. 23, 2023

(30) Foreign Application Priority Data

Oct. 7, 2020 (JP) ................................ 2020-169778

(51) Int. Cl.
*H01R 13/506* (2006.01)
*H01R 13/52* (2006.01)
*H01R 43/00* (2006.01)

(52) U.S. Cl.
CPC ....... *H01R 13/5208* (2013.01); *H01R 13/506* (2013.01); *H01R 43/005* (2013.01)

(58) Field of Classification Search
None
See application file for complete search history.

(56) References Cited

U.S. PATENT DOCUMENTS 5,569,050 A * 10/1996 Lloyd ................. B29C 66/1226 439/465
5,714,717 A 2/1998 Nakagome
(Continued)

FOREIGN PATENT DOCUMENTS

CN 1116566620 9/2020
JP 6-36808 2/1994
(Continued)

OTHER PUBLICATIONS

International Search Report, issued in International Patent Application No. PCT/JP2021/034353, dated Nov. 16, 2021, with English translation.

(Continued)

*Primary Examiner* — Tho D Ta
(74) *Attorney, Agent, or Firm* — GREENBLUM & BERNSTEIN, P.L.C.

(57) ABSTRACT

A wiring member includes: a connector housing including at least one housing body, with an opening in one main surface and a housing groove concaved toward another main surface, and a cover attached to the housing body; a wire-like transmission member including an end portion housed in the housing groove; and a filling member filling the housing groove. The housing body includes a bottom wall part and a sidewall part as wall parts of the housing groove. The cover includes a cover body part overlapped with the one main surface of the housing body to cover the housing groove. The filling member is also provided between a (Continued)

portion of the one main surface serving as a tip end surface of the sidewall part and the cover body part.

7 Claims, 10 Drawing Sheets

(56) References Cited

U.S. PATENT DOCUMENTS

| | | | | | |
|---|---|---|---|---|---|
| 6,027,589 | A | | 2/2000 | Kato et al. | |
| 6,142,825 | A | * | 11/2000 | Shinchi | H01R 43/005 439/587 |
| 6,485,325 | B1 | | 11/2002 | Fukuda | |
| 2004/0077213 | A1 | | 4/2004 | Sakiyama et al. | |
| 2020/0373702 | A1 | | 11/2020 | Ebata et al. | |

FOREIGN PATENT DOCUMENTS

| | | |
|---|---|---|
| JP | 8-306428 | 11/1996 |
| JP | 10-321287 | 12/1998 |
| JP | 11-121084 | 4/1999 |
| JP | 2000-164292 | 6/2000 |
| JP | 2000-353566 | 12/2000 |
| JP | 2002-164092 | 6/2002 |
| JP | 2004-127601 | 4/2004 |
| JP | 2009-87853 | 4/2009 |
| JP | 2011-146206 | 7/2011 |
| JP | 2019-128996 | 8/2019 |
| WO | 2019/142422 | 7/2019 |

OTHER PUBLICATIONS

International Preliminary Report on Patentability, issued in International Patent Application No. PCT/JP2021/034353, dated Mar. 28, 2023, with English translation.
Japan Office Action issued in JP Application No. 2020-169778, dated Feb. 6, 2024.
China, Office Action issued in CN Application No. 202180064742.9, dated Jun. 14, 2025, and English language translation thereof.
Japan, Notice of Reasons for Refusal received in JP Application No. 2024-084515, dated Jul. 1, 2025, and English language translation thereof.

* cited by examiner

WIRING MEMBER INCLUDING A CONNECTOR HOUSING CONTAINING A FILLING MEMBER

TECHNICAL FIELD

The present disclosure relates to a wiring member.

BACKGROUND ART

Ingress of water through a cavity is suppressed in a connector in some cases. In this case, a rubber plug put on an end portion of an electrical wire is firmly attached to an inner surface of the cavity in some cases as with a waterproof connector described in Patent Document 1, for example.

In some connector, an end portion of an electrical wire is disposed between two members of a body in which a housing groove is formed and a cover covering the housing groove as with a connector described in Patent Document 2.

PRIOR ART DOCUMENTS

Patent Document(s)

Patent Document 1: Japanese Patent Application Laid-Open No. 2011-146206

Patent Document 2: Japanese Patent Application Laid-Open No. 2019-128996

SUMMARY

Problem to be Solved by the Invention

When an end portion of a wire-like transmission member is disposed between a plurality of members as with the connector described in Patent Document 2, a gap between a sidewall of the groove and the cover needs to be filled, and it may be hard to fill this portion by a rubber plug in some cases.

Accordingly, an object is to provide a technique capable of simply making a connector in which an end portion of a wire-like transmission member is disposed between a plurality of members waterproof.

Means to Solve the Problem

A wiring member according to the present disclosure is a wiring member including: a connector housing including at least one housing body, with an opening in one main surface and a housing groove concaved toward another main surface, and a cover attached to the housing body; a wire-like transmission member including an end portion housed in the housing groove; and a filling member filling the housing groove, wherein the housing body includes a bottom wall part and a sidewall part as wall parts of the housing groove, the cover includes a cover body part overlapped with the one main surface of the housing body to cover the housing groove, and the filling member is also provided between a portion of the one main surface serving as a tip end surface of the sidewall part and the cover body part.

Effects of the Invention

According to the present disclosure, a connector in which an end portion of a wire-like transmission member is disposed between a plurality of members can be simply made to be waterproof.

DESCRIPTION OF EMBODIMENT(S)

Description of Embodiment of Present Disclosure

Figure 1:
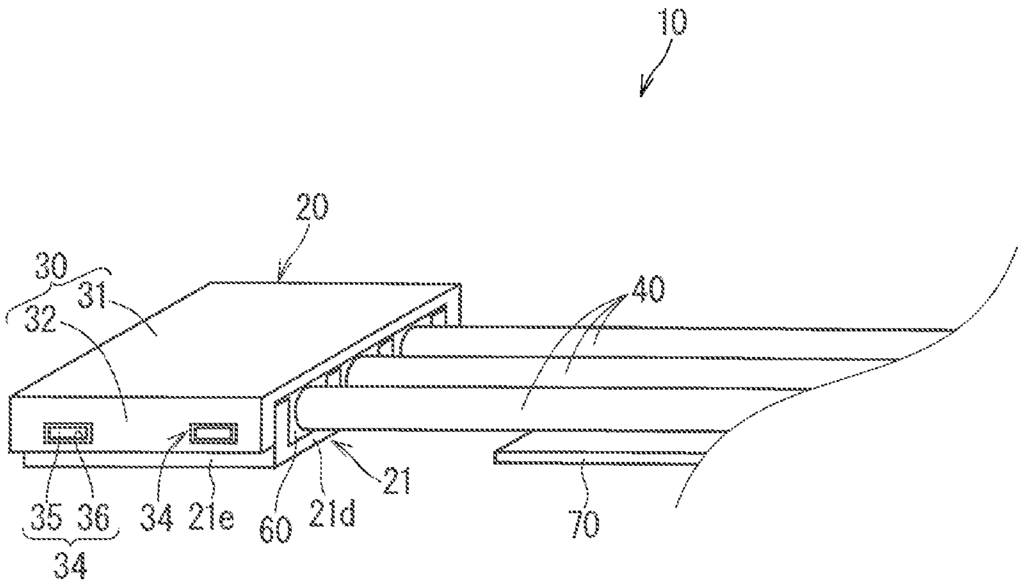
FIG. 1 is a perspective view illustrating a wiring member according to an embodiment 1.

Embodiments of the present disclosure are listed and described firstly.

A wiring member according to the present disclosure is as follows.

(1) A wiring member includes: a connector housing including at least one housing body, with an opening in one main surface and a housing groove concaved toward another main surface, and a cover attached to the housing body; a wire-like transmission member including an end portion housed in the housing groove; and a filling member filling the housing groove, wherein the housing body includes a bottom wall part and a sidewall part as wall parts of the housing groove, the cover includes a cover body part overlapped with the one main surface of the housing body to cover the housing groove, and the filling member is also provided between a portion of the one main surface serving as a tip end surface of the sidewall part and the cover body part. The filling member is also provided between the end surface of the sidewall part and the cover body part, thus ingress of water from the gap therebetween is also suppressed by the filling member. Accordingly, the connector in which the end portion of the wire-like transmission member is disposed between the plurality of members can be simply made to be waterproof.

(2) In the wiring member according to (1), the filling member may also be provided between the bottom wall part and the wire-like transmission member. Accordingly, the filling member can cover a whole periphery of the wire-like transmission member.

(3) In the wiring member according to (2), it is also applicable that a gap formation part separating the wire-like transmission member and the bottom wall part is provided to the bottom wall part, and the filling member is provided in a gap formed by the gap formation part between the bottom wall part and the wire-like transmission member. Accordingly, even when the filling material filling the gap between the bottom wall part and the wire-like transmission member is not previously disposed, the filling material which has been heated and melted can reach to fill the gap formed by the gap formation part between the bottom wall part and the wire-like transmission member.

(4) In the wiring member according to (2), a portion of the bottom wall part provided with the filling member may be flat in a longitudinal direction of the housing groove. Accordingly, the filling member is provided between the bottom wall part and the wire-like transmission member with no gap formation part, and a shape of the housing body can be simplified.

(5) In the wiring member according to (1), it is also applicable that an inner surface of the bottom wall part and an outer surface of the wire-like transmission member are formed into shapes corresponding to each other, and the bottom wall part and the wire-like transmission member are firmly attached without intervention of the filling member. Accordingly, waterproof can be simply achieved without the filling member between the bottom wall part and the wire-like transmission member.

(6) In the wiring member according to any one of (1) to (5), it is also applicable that the connector housing includes the plurality of housing bodies, the plurality of housing bodies are stacked on each other, and the filling member is also provided between the housing bodies. Accordingly, a gap between layers of the lamination connector can be waterproofed by the filling member.

(7) In the wiring member according to any one of (1) to (6), the filling member may be bonded to each of the cover and the housing body to fix the cover and the housing body. Accordingly, a locking mechanism mechanically fixing the cover and the housing body can be omitted or simplified.

(8) In the wiring member according to (7), it is also applicable that provided are a first bonding part and a second bonding part bonding the cover and the housing body via the filling member, the first bonding part is a portion bonding the tip end surface of the sidewall part and the cover body part via the filling member, and the second bonding part has higher bonding strength than the first bonding part. Accordingly, bonding strength of the cover and the housing body is increased, and a locking mechanism mechanically fixing the cover and the housing body can be omitted or simplified.

(9) It is also applicable that the wiring member according to any one of (1) to (8) further includes a locking mechanism fixing the housing body and the cover, and the locking mechanism includes a locking part provided to the housing body and a locking receiving part provided to the cover to be locked to the locking part. Accordingly, the housing body and the cover can be fixed by the locking mechanism even in a case where the filling member is hardly bonded to the cover and the housing.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
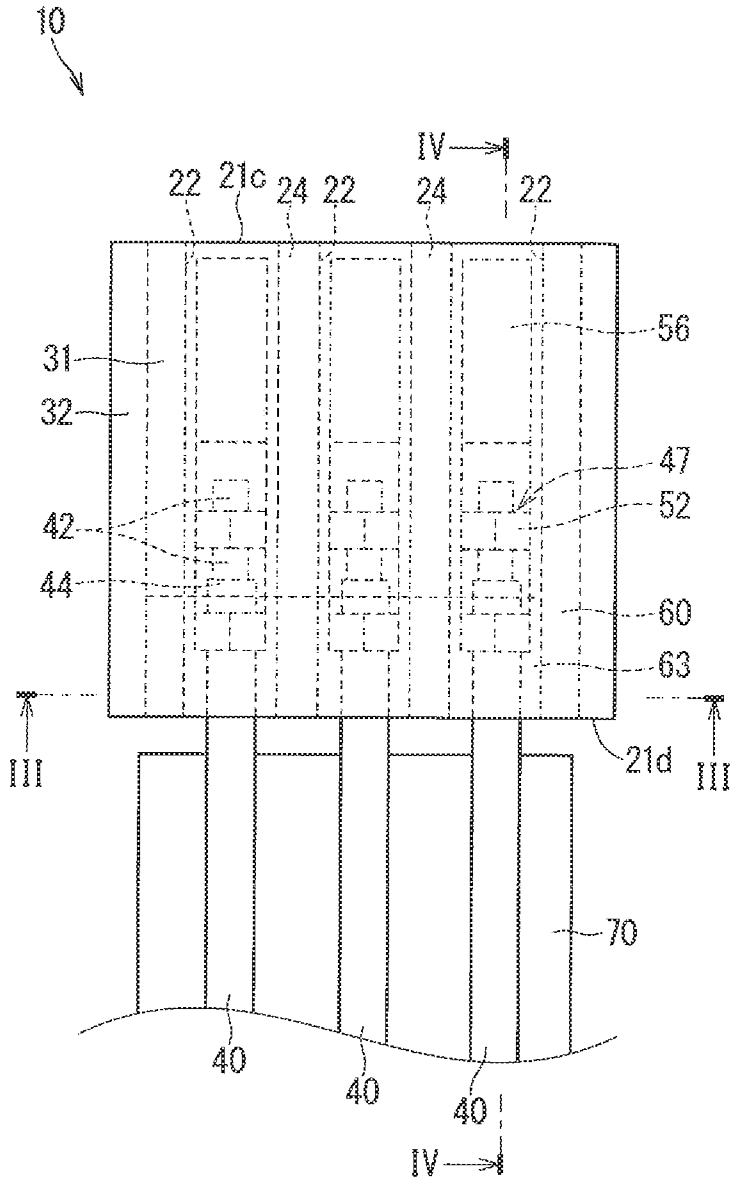
FIG. 2 is a plan view illustrating the wiring member according to the embodiment 1.
Figure 3:
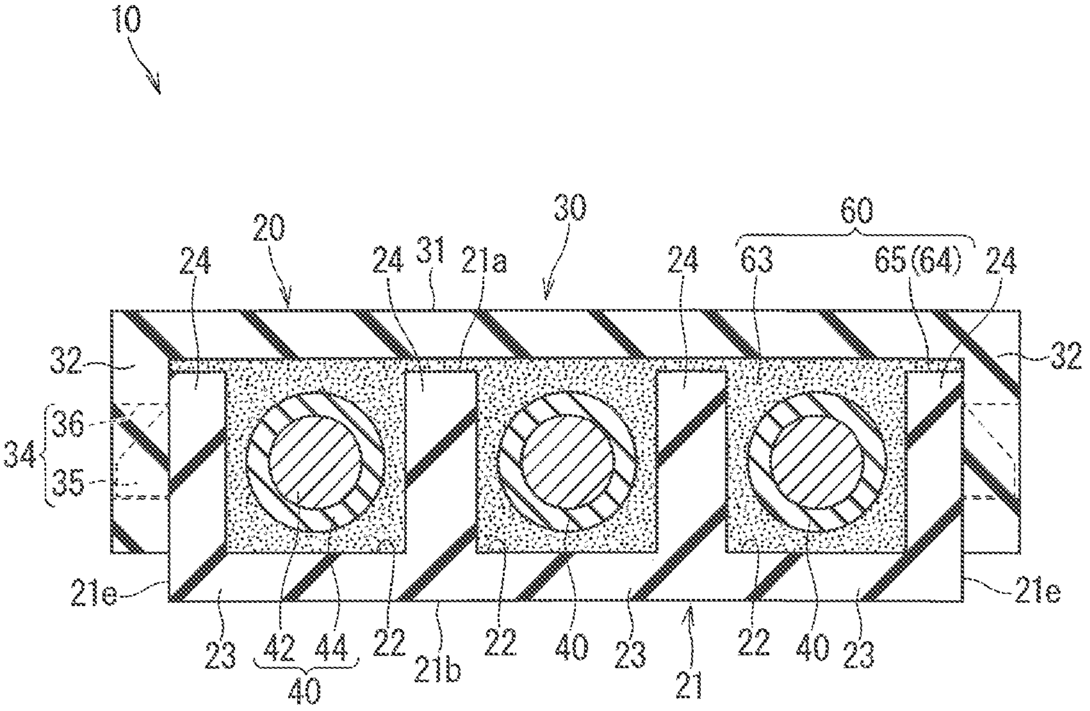
FIG. 3 is a cross-sectional view of the wiring member cut along a III-III line in FIG. 2.
Figure 4:
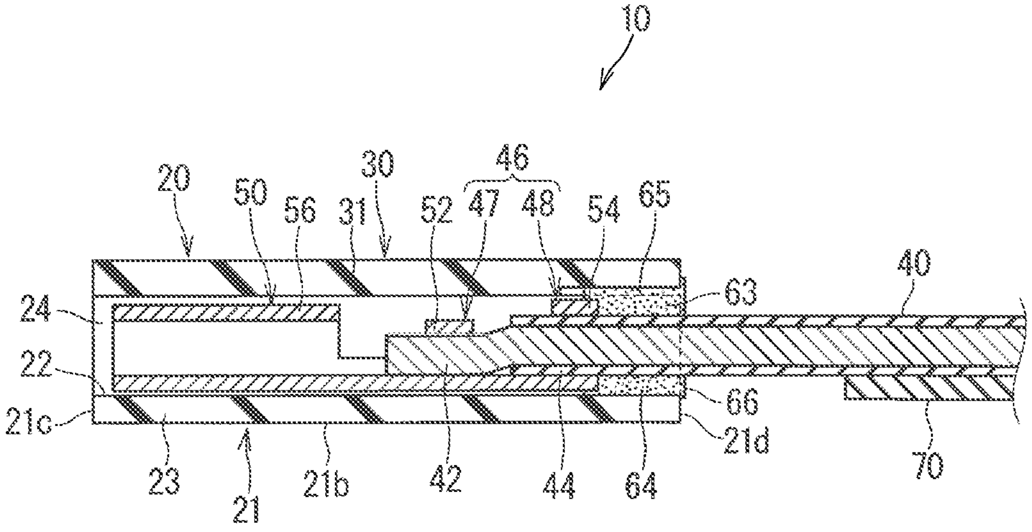
FIG. 4 is a cross-sectional view of the wiring member cut along a IV-IV line in FIG. 2.

A wiring member 10 according to an embodiment 1 is described hereinafter. FIG. 1 is perspective view illustrating the wiring member 10 according to the embodiment 1. FIG. 2 is a plan view illustrating the wiring member 10 according to the embodiment 1. FIG. 3 is a cross-sectional view of the wiring member 10 cut along a III-III line in FIG. 2. FIG. 4 is a cross-sectional view of the wiring member 10 along a IV-IV line in FIG. 2.

The wiring member 10 includes a connector housing 20, a wire-like transmission member 40, and a filling member 60. Herein, the wiring member 10 further includes a sheet 70.

The connector housing 20 includes a housing body 21 and a cover 30. The housing body 21 and the cover 30 are molded members each made up of resin such as polybutylene telephthalate (PBT) having insulation properties, for example, as a material. The housing body 21 and the cover 30 are attached after molded as members different from each other.

The housing body 21 includes surfaces in three sets directed to three directions perpendicular to each other. These three directions are referred to as a height direction, a depth direction, and a width direction, respectively, in some cases hereinafter, and these directions are also applied to the connector housing 20. The surfaces in one set directed to be opposite to each other in the height direction are referred to as one main surface 21*a* and the other main surface 21*b*. The surfaces in one set directed to be opposite to each other in the depth direction are referred to as a front end surface 21*c* and a back end surface 21*d*. The surfaces in one set directed to be opposite to each other in the width direction are referred to as a pair of side surfaces 21*e*.

At least one (herein, a plurality of) housing groove 22 is formed in the housing body 21. The housing groove 22 has an opening in one main surface 21*a*, and is concaved toward the other main surface 21*b*. The housing groove 22 extends in the depth direction. Both end portions of the housing groove 22 along the depth direction reach the front end surface 21*c* and the back end surface 21*d*, respectively. Accordingly, the housing groove 22 includes openings on three sides of the housing body 21. In these three openings, the opening in one main surface 21*a*, the opening in the front end surface 21*c*, and the opening of the back end surface 21*d* are referred to as an upper side opening, a front side opening, and a back side opening, respectively, in some cases. The wire-like transmission member 40 having the end portion housed in the housing groove 22 is drawn to an outer side of the housing body 21 from the back side opening. The front side opening is used to connect the end portion of the wire-like transmission member 40 housed in the housing groove 22 to the other side transmission member. The plurality of housing grooves 22 are arranged in a row in the width direction. The housing body 21 includes a bottom wall part 23 and a sidewall part 24 as wall parts of the housing groove 22. The bottom wall part 23 is a wall part constituting a bottom of the housing groove 22. Herein, a portion of the bottom wall part 23 provided with the filling member 60 (portion on a side of the back end surface 21*d*) is flat in a longitudinal direction of the housing groove 22. A convex portion or a concave portion caught in a terminal 50 in the depth direction so that the terminal 50 does not come out of the housing body 21 may be formed in a portion of the bottom wall part 23 on a side of the front end surface 21*c*. The other main surface 21*b* is an outer surface of the bottom wall part 23 directed to a side opposite to the housing groove 22. The sidewall part 24 is a wall part formed on both lateral sides of the housing groove 22. The sidewall part 24 protrudes from the bottom wall part 23 in the height direction. The plurality of sidewall parts 24 are arranged side by side in the width direction. Outer surfaces of the sidewall parts 24 located on an outermost side in the width direction in the plurality of sidewall parts 24 are the pair of side surfaces 21*e*. A tip end surface of the plurality of sidewall parts 24 in the height direction is one main surface 21*a*.

The cover 30 is attached to the housing body 21. The cover 30 includes a cover body part 31. Herein, the cover 30 further includes a pair of lateral cover parts 32. The cover body part 31 is overlapped with one main surface 21*a* of the housing body 21 to cover an upper side opening of the housing groove 22. It is sufficient that a level difference is formed in at least one of the tip end surface of the sidewall part 24 and/or the cover body part 31 so as to have contact with each other on the side of the front end surface 21*c* and be separated from each other on the side of the back end surface 21*d*. The tip end surface of the sidewall part 24 and the cover body part 31 are separated from each other on the side of the back end surface 21*d*, thus a space in which a base material B1 (refer to FIG. 5) described hereinafter is disposed is ensured. The pair of lateral cover parts 32 protrude from both lateral sides of the cover body part 31 in the height direction. The pair of lateral cover parts 32 cover the pair of side surfaces 21*e* of the housing body 21. Herein, the side surface 21*e* and the lateral cover part 32 are uniformly flat, but may have a concave-convex shape. A part of the side surface 21*e* along the depth direction may protrude more than the other part in the width direction to provide a level difference, for example.

Herein, a locking mechanism 34 is provided to the connector housing 20 to fix the housing body 21 and the cover 30. The locking mechanism 34 fixes the housing body 21 and the cover 30. The locking mechanism 34 includes a locking part 35 and a locking receiving part 36. The locking part 35 is provided to the housing body 21. The locking receiving part 36 is provided to the cover 30. The locking receiving part 36 is locked to the locking part 35. One of the locking part 35 and the locking receiving part 36 is a convex portion, and the other one thereof is a concave portion. Herein, the locking part 35 is a convex portion, and the locking receiving part 36 is a concave portion, however, an inverse configuration is also applicable.

More specifically, the convex portion is formed in the side surface 21*e*, and the convex portion is formed in the lateral cover part 32. The concave portion is formed into a through hole-like shape. The convex portion is fitted in the concave portion, and locked thereto. Two sets of convex portion and the concave portion are provided for one set of side surface 21*e* and the lateral cover part 32. The two sets of convex portion and the concave portion are provided separately from each other in the depth direction. One set of convex portion and the concave portion may be provided for one set of side surface 21*e* and the lateral cover part 32.

The wire-like transmission member 40 is a member transmitting electrical power or light. For example, the wire-like transmission member 40 is an electrical wire 40 transmitting electrical power or an optical fiber cable transmitting light. The wire-like transmission member 40 includes a transmission wire body 42 and a covering layer 44. The transmission wire body is a portion transmitting electrical power or light. The transmission wire body 42 is a core wire 42 made up of a conductor in the covering electrical wire 40 or a core and a clad in an optical fiber cable, for example. The covering layer 44 is a member covering a periphery the transmission wire body 42. The covering layer 44 is formed of resin such as polyvinyl chloride (PVC) or polyethylene (PE) extrusion molded around the transmission wire body 42, for example. One wire-like transmission member may include a single transmission wire body or a plurality of transmission wire bodies. The wire-like transmission member may be a single wire-like object or a composite object of a plurality of wire-like objects (a twisted wire and a cable made up of a plurality of wire-like objects covered by a sheath). In the description hereinafter, the wire-like transmission member 40 is a covering electrical wire 40 (simply referred to as the electrical wire 40 hereinafter).

A terminal crimping part 46 is provided to an end portion of the electrical wire 40. The terminal crimping part 46 is a portion where the terminal 50 crimped to the electrical wire 40. The terminal crimping part 46 includes a core wire crimping part 47 and a covering crimping part 48. More specifically, the core wire 42 is exposed from the covering layer 44 in the end portion of the electrical wire 40. The terminal 50 is formed by bending and deforming a plate material having conductivity, for example. The terminal 50 includes a wire barrel 52, an insulation barrel 54, and the other side connection part 56. The wire barrel 52 is a portion crimped to the core wire 42 exposed from the covering layer 44. The portion of the wire barrel 52 crimped to the core wire 42 is the core wire crimping part 47. The electrical wire 40 and the terminal 50 are electrically connected via the core wire crimping part 47. The insulation barrel 54 is a portion crimped to the covering layer 44. The portion of the insulation barrel 54 crimped to the covering layer 44 is the covering crimping part 48. The other side connection part 56 is a portion electrically connected to the other side conductor. Herein, the other side connection part 56 is formed into a female terminal shape. Needless to say, the other side connection part 56 may be formed into a male terminal shape, for example.

The end portion of the electrical wire 40 is housed in the housing groove 22. The end portion of the electrical wire 40 is normally inserted into the housing body 21 in a state before the cover 30 is attached thereto from the upper side opening of the housing groove 22. The terminal crimping part 46 is housed on the side of the back end surface 21*d* of the housing groove 22. The covering layer 44 extending from the terminal crimping part 46 protrudes from the back side opening. Herein, a part of the covering layer 44 continuing into the terminal crimping part 46 is also housed on the side of the back end surface 21*d* of the housing groove 22. When the other side connection part 56 has the female terminal shape, the other side connection part 56 is generally housed in the housing groove 22, and does not protrude from the front side opening. Alternatively, a male terminal on the other side is inserted into the housing groove 22 from the front side opening, and has contact with the other side connection part 56 as a female terminal, thus they are electrically connected to each other. When the other side connection part 56 has the male terminal shape, the other side connection part 56 generally protrudes to an outer side of the housing groove 22 from the front side opening.

In the example illustrated in FIG. 4, the end portion of the electrical wire 40 is housed in the housing groove 22 so that a bottom portion of the terminal crimping part 46 is located on a side of the bottom wall part 23, but needs not necessarily be housed in this direction. For example, the end portion of the electrical wire 40 may be housed in the housing groove 22 in a direction opposite to that in FIG. 4 in the height direction, that is to say, in a direction so that the bottom portion of the terminal crimping part 46 is located on a side of the cover body part 31.

The filling member 60 fills the housing groove 22. The filling member 60 is also provided between the tip end surface of the sidewall part 24 and the cover body part 31. The filling member 60 includes an inner portion 62 and an outer portion 64. The inner portion 62 and the outer portion 64 are connected to each other.

The inner portion 62 is a portion located in an inner part of each of the plurality of housing grooves 22. The inner portion 62 includes a water stop part 63. The water stop part 63 blocks a gap between the wire-like transmission member 40 and the wall part of the housing groove 22 in a part of the housing groove 22 along the depth direction to suppress ingress of water. The inner portion 62 may include only the water stop part 63, or may also include a portion other than the water stop part 63. A portion other than the water stop part 63 is a portion provided so that the gap remains between the wire-like transmission member 40 and the wall part of the housing groove 22.

Herein, the water stop part 63 blocks the gap between the wire-like transmission member 40 and the wall part of the housing groove 22 in a position of the covering layer 44 extending from the terminal crimping part 46. A filling material in the water stop part 63 is provided at least between the wire-like transmission member 40 and the sidewall part 24 and between the wire-like transmission member 40 and the cover body part 31. Herein, the filling material in the water stop part 63 is also provided between the bottom wall part 23 and the wire-like transmission member 40. Thus, the water stop part 63 herein covers a whole periphery of the wire-like transmission member 40. The water stop part 63 may also be provided in a position of the terminal crimping part 46 or a position of the covering crimping part 48, for example.

The outer portion 64 is a portion located in an outer side of the housing groove 22. Herein, the outer portion 64 includes a first outer portion 65 and a second outer portion 66. The first outer portion 65 is a portion located on an outer side of one main surface 21*a* along the height direction of the housing groove 22. The first outer portion 65 extends to one main surface 21*a* of the housing body 21. The filling member 60 is formally sectioned into the inner portion 62 and the first outer portion 65 in the upper side opening as a boundary. The plurality of inner portions 62 are connected to each other via the outer portion 64. A part of the first outer portion 65 is a portion of the filling member 60 located between the tip end surface of the sidewall part 24 and the cover body part 31. The second outer portion 66 is a portion located on an outer side of back end surface 21*d* along the depth direction. The second outer portion 66 may extend in the height direction and the width direction with respect to the back side opening, or may also have contact with an edge portion of the back side opening of the back end surface 21*d*. The filling member 60 is formally sectioned into the inner portion 62 and the second outer portion 66 in the back side opening as a boundary. The second outer portion 66 may be omitted.

A range where the filling member 60 is provided along the depth direction can be appropriately set, however, the range where the filling member 60 is provided along the depth direction is herein set to a range from the back end surface 21*d* to the terminal crimping part 46. Particularly, the range where the filling member 60 is provided along the depth direction is herein set to a range from the back end surface 21*d* to the covering crimping part 48.

The filling member 60 is a member made up of the sheet-like resin base material B (refer to FIG. 5) thermally deformed to have a shape corresponding to the housing groove 22. The resin material is not particularly limited, but can be appropriately set. The resin material of the filling member 60 preferably has a melting point lower than the resin material of the connector housing 20. The melting point of the filling member 60 may be lower than that of the covering layer 44 of the wire-like transmission member 40. The filling member 60 may be made up of the same material as that of the covering layer 44 of the wire-like transmission member 40. The filling member 60 may be made up of a material different from that of the covering layer 44 of the wire-like transmission member 40. The resin material of the filling member 60 may be a resin material used for a hot-melt adhesive agent.

The sheet 70 keeps the plurality of electrical wires 40 in a state of being arranged side by side. Each electrical wire 40 is fixed to the sheet 70 while the plurality of electrical wires 40 are arranged side by side, thus the plurality of electrical wires 40 are kept in the state of being arranged side by side. The plurality of electrical wires 40 may be kept in a state of being arranged in the same arrangement order as that in the connector housing 20 in the end portion of the sheet 70, for example. Accordingly, the end portions of the plurality of electrical wires 40 can be collectively housed in the corresponding housing groove 22 easily.

A fixing state of the sheet 70 and the electrical wire 40 is not particularly limited. For example, fusion, adhesion via an adhesive member such as an adhesive agent or a double-sided adhesive tape, or mechanical fixation using a clip or a rivet is also applicable. When the sheet 70 and the electrical wire 40 are fused to each other, the sheet 70 preferably includes a fusion layer. The sheet 70 may have a single layer structure of only a fusion layer, or may also have a multi-layer structure of a fusion layer with an additional layer thereon. When the sheet 70 has the multilayer structure of the fusion layer and the additional layer, the fusion layer is preferably located at least on one main surface 21*a* of the sheet 70.

The fusion layer is a layer which can be fused to the covering layer 34 of the wire-like transmission member 40. The fusion layer includes a resin material, or preferably includes a thermoplastic resin material. The resin material of the fusion layer is softened and fused to a fusion target. A type of the resin material is not particularly limited, however, PVC, PE, polypropylene (PP), or polyethylene terephthalate (PET) can be adopted, for example. The fusion layer and the covering layer 44 preferably include the same type of resin material.

The additional layer is formed of a material different from that of the fusion layer, or has a different structure. The additional layer increases a function of the fusion layer, or adds a function which the fusion layer does not have to the sheet 70. A material constituting the additional layer is a material described for the fusion layer described above or metal, for example. A structure of the additional layer may be any of the structure described for the fusion layer described above. The additional layer may made up of a single layer or two or more layers.

A structure of each layer in the sheet 70 is not particularly limited. Each layer in the sheet 70 can be appropriately selected from a sheet having an evenly filled cross-sectional surface (also referred to as a non-foam sheet or a solid sheet, for example), a foam sheet, or a fibrous material sheet, for example. The fibrous material sheet is a sheet made up of combined fibers such as a braided cloth, a woven cloth, or a non-woven cloth, for example.

The sheet 70 may be a flexible member. The sheet 70 may have a plastic property so as to be able to follow bending of the wire-like transmission member 40. It is also applicable that the sheet 70 is easily bended in a thickness direction (bended along an axis parallel to a main surface of the sheet 70) and is hardly bended in a direction intersecting with the thickness direction (b ended along an axis perpendicular to the main surface of the sheet 70) in a state where the sheet 70 is developed.

The wire-like transmission member 40 is disposed on the fusion layer of the sheet 70. The wire-like transmission member 40 is fused to the fusion layer. Accordingly, the wire-like transmission member 40 is kept in a state of being disposed along a predetermined route on the sheet 70. The predetermined route of the wire-like transmission member 40 on the sheet 70 is a route corresponding to a wiring route of the wire-like transmission member 40 in a vehicle, for example. In this manner, the wire-like transmission member 40 is held by the sheet 70 in a state of extending to correspond to the route in the vehicle, thus the wire-like transmission member 40 is easily disposed long a predetermined wiring route when the wiring member 10 is assembled to the vehicle.

The predetermined route of the wire-like transmission member 40 on the sheet 70 includes one of or both a straight section and a bending section. The predetermined route of the wire-like transmission member 40 on the sheet 70 preferably includes two straight sections and a bending section therebetween. When the plurality of wire-like transmission members 40 are included, it is also applicable that all routes of the plurality of wire-like transmission members 40 are the same, or routes of some of the wire-like transmission members 40 are different from those of the other some of the wire-like transmission members 40. When the routes of some of the wire-like transmission members 40 are different from those of the other some of the wire-like transmission members 40, a branch part where some of the wire-like transmission members 40 are branched from the other some of the wire-like transmission members 40 may be provided on the sheet 70. The branch part is provided on the sheet 70, thus a portion including the branch part can also be held in the predetermined route. When the plurality of wire-like transmission members 40 are included, an intersection part where the wire-like transmission members 40 intersect with each other may be provided on the sheet 70.

A planar shape of the sheet 70 is preferably formed into a shape corresponding to the predetermined route of the wire-like transmission member 40 on the sheet 70. When the predetermined route of the wire-like transmission member 40 includes the bending section, the planar shape of the sheet 70 is also preferably bended in accordance with the bending section. When the predetermined route of the wire-like transmission member 40 includes the branch part, the planar shape of the sheet 70 is also preferably branched in accordance with the branch part. The sheet 70 is preferably formed so that a dimension thereof along an extension direction of the wire-like transmission member 40 is larger than that along a width direction of the wire-like transmission member 40.

The fusion part where the sheet 70 and the wire-like transmission member 40 are fused to each other may be provided in a plurality of positions at intervals along the extension direction of the wire-like transmission member 40. Each fusion part in this case is a spot fusion part having a short side in the extension direction of the wire-like transmission member 40. The fusion part where the sheet 70 and the wire-like transmission member 40 are fused to each other may be sequentially provided along the extension direction of the wire-like transmission member 40.

<Manufacturing Method>

Figure 5:
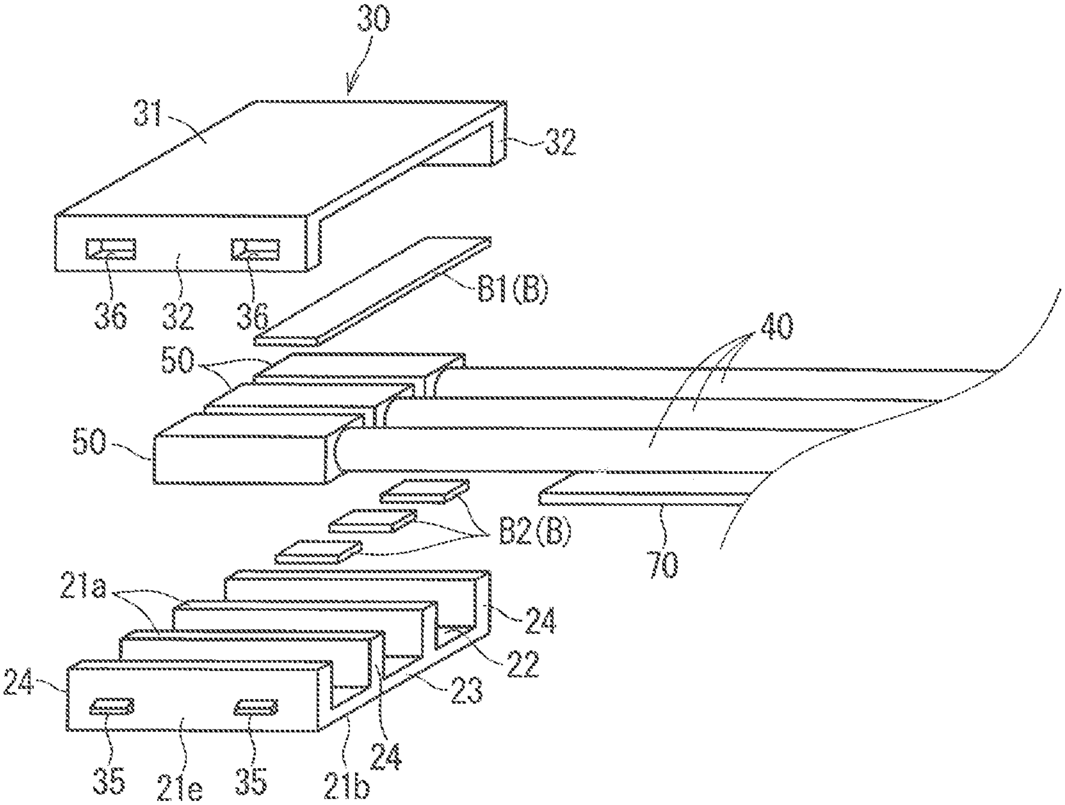
FIG. 5 is a schematic diagram illustrating a manufacture of the wiring member according to the embodiment 1.
Figure 6:
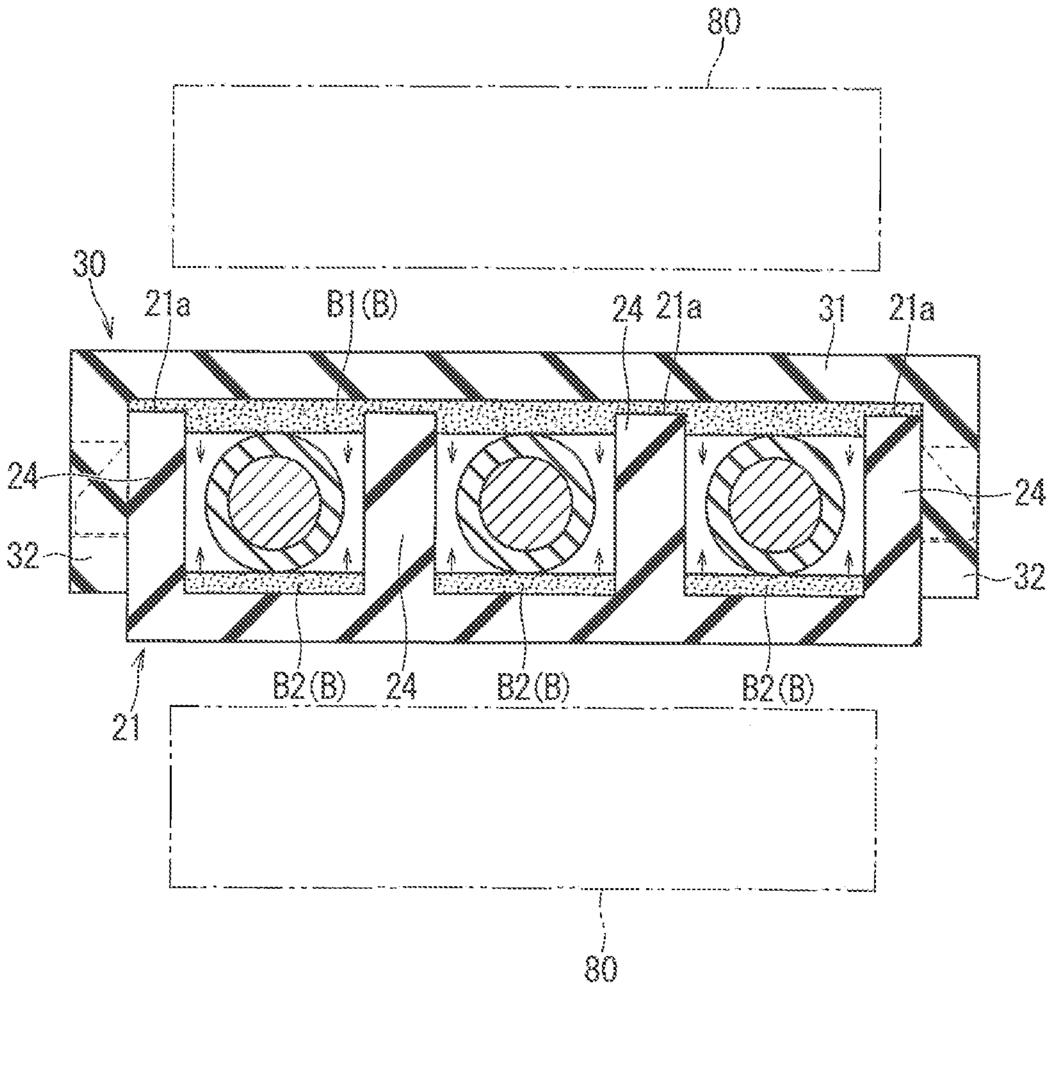
FIG. 6 is a schematic diagram illustrating a manufacture of the wiring member according to the embodiment 1.

An example of a method of manufacturing the wiring member 10 is described with reference to FIG. 5 and FIG. 6. FIG. 5 and FIG. 6 are schematic diagrams each illustrating a manufacture of the wiring member 10 according to the embodiment 1. FIG. 5 is an exploded perspective view of a member constituting the wiring member 10.

In manufacturing the wiring member 10, a wiring body with a sheet, the base material B, the housing body 21, and the cover 30 are firstly prepared as illustrated in FIG. 5. In the wiring body with the sheet, the plurality of electrical wires 40 are fixed side by side to the sheet 70, and the terminal 50 is crimped to the end portion of each electrical wire 40. The plurality of electrical wires 40 need not be fixed side by side to the sheet 70 to constitute the wiring body with the sheet, however, when the wiring body with the sheet is used, the end portion of the electrical wire 40 is easily housed in the housing body 21. The base material B is a member thermally deformed to be the filling member 60. The base material B is formed into a sheet-like shape. Herein, two types of base materials B1 and B2 are prepared. A length dimension (dimension along the width direction of the housing body 21) of the base material B1 has a dimension (the same dimension herein) corresponding to the width dimension of the housing body 21, and one base material B1 is prepared. The base material B2 has a width dimension equal to or smaller than the housing groove 22, and the plurality of base materials B2 are prepared.

The plurality of base materials B2 are disposed on the bottom wall part 23 of each of the plurality of housing grooves 22. The end portion of the electrical wire 40 is disposed on the base material B2 in each housing groove 22. Then, the base material B1 is put on one main surface 21*a* of the housing body 21. The cover 30 is put on the housing body 21, and the locking mechanism 34 is locked. At this time, the tip end surface of the sidewall part 24 and the cover 30 are separated from each other on the side of the back end surface 21*d* by a level difference provided to the connector housing, thus the locking mechanism 34 can be firmly locked even when the base material B1 is provided between the tip end surface of the sidewall part 24 and the cover 30. According to the above process, an operation of assembling the connector before heating the base material B is completed, and as illustrated in FIG. 6, the end portion of the electrical wire 40 is sandwiched between the base materials B1 and B2. The base material B1 is sandwiched between the tip end surface of the sidewall part 24 and the cover body part 31. A part of the base materials B1 and B2 may be compressed in the height direction.

In this state, a gap occurs between the covering layer 44 and the sidewall part 24, for example, as illustrated in FIG. 6. The base material B in the housing groove 22 is heated to fill this gap. A method of heating the base material B is not particularly limited, however, the base material B in the housing groove 22 may be heated by hot-air heating the base material B from an outer side of the connector housing 20 toward the back side opening of the housing groove 22 using a heating device 80. It is also applicable that the connector housing 20 is heated, and the base material B in the housing groove 22 is heated by heat conduction from the connector housing 20, for example.

The heated base material B in the housing groove 22 is eventually softened, and as shown by an arrow in FIG. 6, the softened base material B flows to fill the gap between the covering layer 44 and the sidewall part 24, for example. The base materials B1 and B2 fused to each other are firmly attached to the sidewall part 24 of the housing groove 22 and the covering layer 44, and then hardened, thereby forming the water stop part 63 as illustrated in FIG. 3. Even when the base material B1 is softened and flows, a portion between the tip end surface of the sidewall part 24 and the cover body part 31 remains as it is, and the first outer portion 65 is formed.

A range of the base material B softened and flowing is determined in accordance with a heating condition, for example, and a shape of a portion of the inner portion 62 except for the water stop part 63 is not particularly limited as long as prevented is a shape thereof interfering with at least an electrical connection between the other side connection part 56 and the other side conductor and an electrical connection between the wire barrel 52 and the core wire 42 made up of a conductor. For example, the portion of the inner portion 62 except for the water stop part 63 may include a portion where base materials B1 and B2 are fused in the manner similar to the water stop part 63. The portion of the inner portion 62 except for the water stop part 63 may include a portion where base materials B1 and B2 are not fused but remain as they are.

Effect Etc. of Embodiment 1

According to the wiring member having the above configuration, the filling member 60 is also provided between the tip end surface of the sidewall part 24 and the cover body part 31, thus ingress of water from the gap therebetween is also suppressed by the filling member 60. Accordingly, the connector in which the end portion of the wire-like transmission member 40 is disposed between the housing body 21 and the cover 30 can be simply made to be waterproof.

It is sufficient that the water stop part 63 is firmly attached to the wall part of the housing groove 22 and the cover body part 31, thus needs not be bonded thereto. It is sufficient that the water stop part 63 is bonded to the wall part of the housing groove 22 and the cover body part 31. When the water stop part 63 is bonded to the wall part of the housing groove 22 and the cover body part 31, ingress of water from a portion between the wall part of the housing groove 22 and a portion between the cover body part 31 and the water stop part 63 is further suppressed. In the similar manner, it is sufficient that the water stop part 63 is firmly attached to the outer surface of the covering layer 44, thus needs not be bonded thereto. The water stop part 63 may be bonded to the outer surface of the covering layer 44. When the water stop part 63 is bonded to the outer surface of the covering layer 44, ingress of water from a portion between the outer surface of the covering layer 44 and the water stop part 63 is further suppressed. The water stop part 63 in the filling member 60 can be formed by heating and melting the sheet-like base material B, for example.

The filling member 60 is also provided between the bottom wall part 23 and the wire-like transmission member 40. Accordingly, the filling member 60 can cover a whole periphery of the wire-like transmission member 40.

A portion of the bottom wall part 23 provided with the filling member 60 is flat in the longitudinal direction of the housing groove 22. Accordingly, the filling member 60 is provided between the bottom wall part 23 and the wire-like transmission member 40 even when the gap formation part is not provided, and a shape of the housing body 21 can be simplified. The filling member 60 can be formed by heating and melting the base material B2 in a state where the end portion of the wire-like transmission member 40 is disposed on the base material B2 previously disposed on the bottom wall part 23, for example. The filling member 60 may be formed by heating and melting the base material B2 in a state where the wire-like transmission member 40 around which the base material B2 is wound is housed in the housing groove 22.

The wiring member 10 further includes the locking mechanism 34 fixing the housing body 21 and the cover 30. Accordingly, the housing body 21 and the cover 30 can be fixed by the locking mechanism 34 even in a case where the filling member 60 is hardly bonded to the housing body 21 and the cover 30. Furthermore, fixation using the locking mechanism 34 can also be used to temporarily hold the housing body 21 and the cover 30 at a time of heating the base material B.

Embodiment 2

Figure 7:
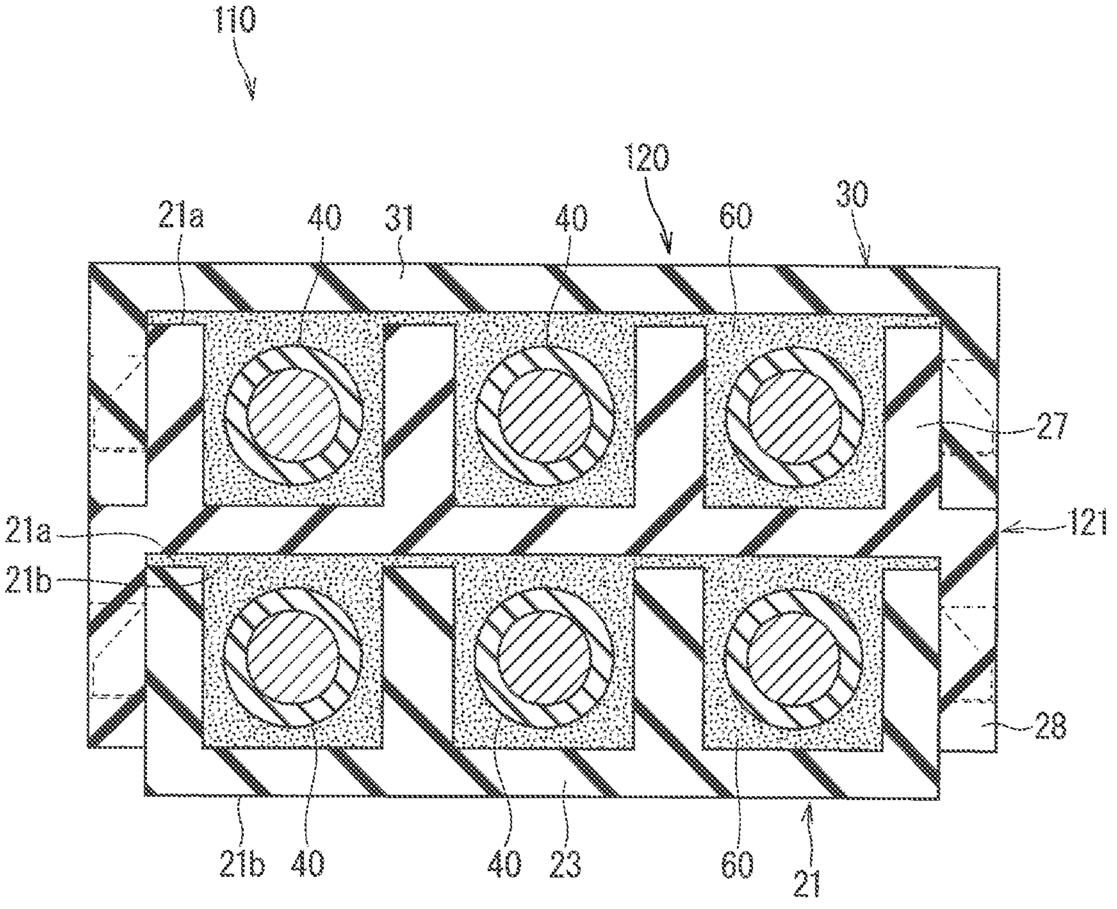
FIG. 7 is a cross-sectional view illustrating a wiring member according to an embodiment 2.
Figure 8:
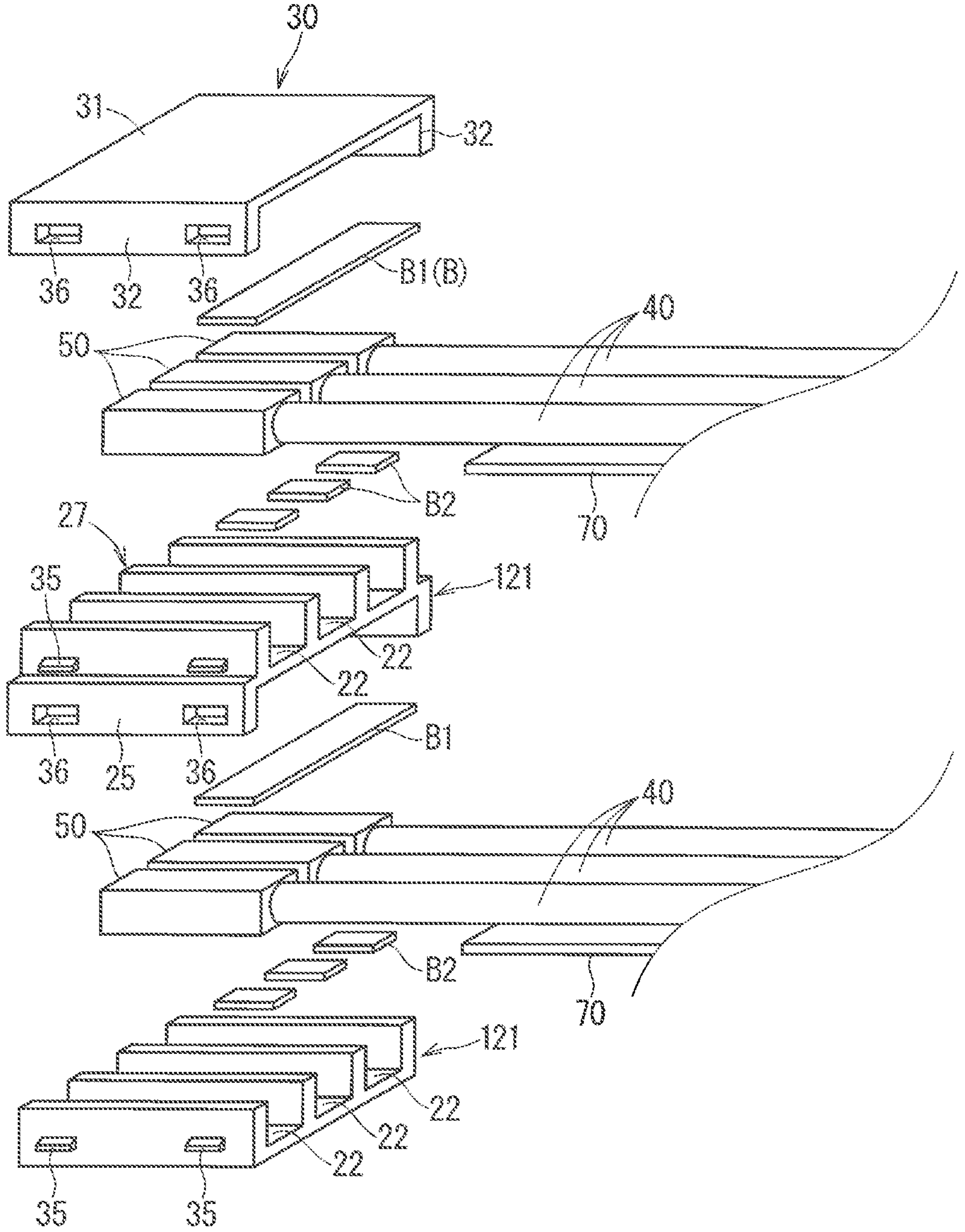
FIG. 8 is a schematic diagram illustrating a manufacture of the wiring member according to the embodiment 2.

A wiring member according to an embodiment 2 is described. FIG. 7 is a cross-sectional plan view illustrating a wiring member 110 according to the embodiment 2. FIG. 8 is a schematic diagram illustrating a manufacture of the wiring member 110 according to the embodiment 2. In the following description of the present embodiment, the same reference numerals are assigned to the similar constituent elements described above, and the description thereof will be omitted. The same applies to the description of each embodiment hereinafter.

The wiring member 110 according to the present example is different from the wiring member 10 described above in that a connector is a lamination connector. The connector housing 120 includes a plurality of housing bodies 21 and 121. The plurality of housing bodies 21 and 121 are stacked on each other. The cover 30 is attached to the housing body 121 on an uppermost side. The housing body 121 stacked on the housing body 21 on a lower side than the housing body 121 substitutes for the cover 30 for the housing body 21 on the lower side.

At this time, the housing body 21 similar to the housing body 21 in the embodiment 1 can be adopted to the housing body 21 on the lowermost side. The housing body 121 on an upper side than the lowermost housing body 21 is configured to double as a cover of the housing body 21 on the lower side. That is to say, the housing body 121 includes a body part 27 and a cover part 28. The body part 27 is formed into a shape similar to the housing body 21. The cover part 28 is formed into a shape similar to a lateral cover part 32 in the embodiment 1, and is provided on a lateral side of the body part 27. The locking part 35 is provided to the body part 27, and the locking receiving part 36 is provided to the cover part 28. The locking part 35 of the body part 27 is locked to a locking receiving part of the housing body or the locking receiving part 36 of the cover 30 on an upper side than the body part 27. The locking receiving part 36 of the cover part 28 is locked to the locking part 35 of the housing body 21 on a lower side than the cover part 28.

The filling member 60 is also provided between the housing bodies 21 and 121 as well as between the housing body 21 and the cover 30. The filling member 60 provided between the housing bodies 21 and 121 can have the configuration similar to the filling member 60 provided between the housing body 21 and the cover 30.

In manufacturing the wiring member 110, the set of the wiring body with the sheet and the base material B in the same number as the layers of the lamination connector are prepared as illustrated in FIG. 8. Then, in the manner similar to the wiring member 10 described above, after the connector is assembled before heating the base material B, the base material B is heated and melted to be able to be the filling member 60.

According to the wiring member 110 of the present example, the connector is the lamination connector, and the filling member 60 is also provided between the housing bodies 21 and 121, thus the portion between the layers of the lamination connector can be made to be waterproof by the filling member 60.

Embodiment 3

Figure 9:
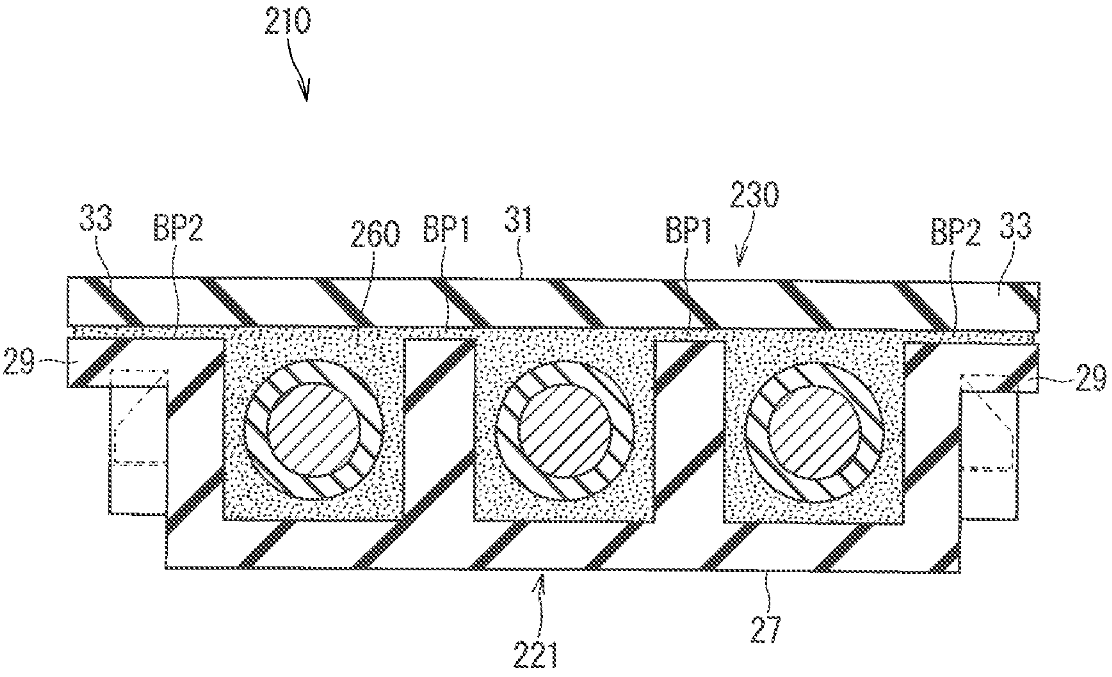
FIG. 9 is a cross-sectional view illustrating a wiring member according to an embodiment 3.
Figure 10:
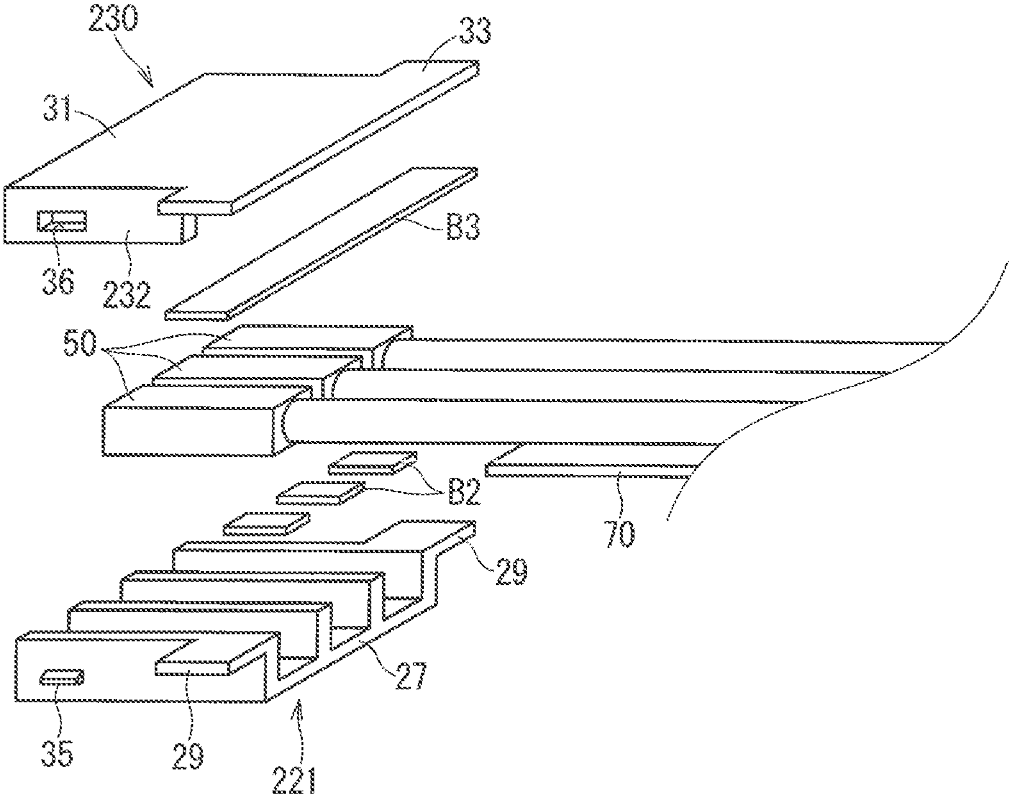
FIG. 10 is a schematic diagram illustrating a manufacture of the wiring member according to the embodiment 3.

A wiring member according to an embodiment 3 is described. FIG. 9 is a cross-sectional plan view illustrating a wiring member 210 according to the embodiment 3. FIG. 10 is a schematic diagram illustrating a manufacture of the wiring member 210 according to the embodiment 3.

A filling member 260 has an adhesion property in the present example. The filling member 260 is bonded to a cover 230 and a housing body 221, thus the cover 230 and the housing body 221 are fixed to each other. Accordingly, a locking mechanism 34 mechanically fixing the cover 230 and the housing body 221 can be omitted or simplified. Herein, the housing body 221 and the cover 230 are fixed by the locking mechanism 34 on the side of the front end surface 21*c*, and are fixed via the filling member 260 having the adhesion property on the side of the back end surface 21*d*. Fixation using the locking mechanism 34 can also be used to temporarily hold the cover 230 and the housing body 221 at a time of heating the base material B in the manner similar to the embodiment 1.

For example, in a portion where the cover 230 and the housing body 221 are fixed by the locking mechanism 34 and a portion where the cover 230 and the housing body 221 are bonded and fixed via the filling member 260, fixation force of a former portion may be smaller than that of a latter portion, or fixation force of a latter portion may be smaller than that of the former portion. The fixation force indicates that the cover 230 and the housing body 221 are detached from each other when force in opposite directions is applied to the cover 230 and the housing body 221 in the height direction. The fixation force of the portion fixed by the locking mechanism 34 and the fixation force of the portion bonded and fixed via the filling member 260 can be measured in a state where one of them is fixed and the other one of them is not fixed. It is also applicable that the locking mechanism 34 on the side of the front end surface 21*c* is omitted and the housing body and the cover are fixed by the filling member 260 having the adhesion property.

At this time, a first bonding part BP1 and a second bonding part BP2 bonding the cover 230 and the housing body 221 via the filling member 260 are provided to the wiring member 210. The first bonding part BP1 is a portion where the tip end surface of the sidewall part 24 and the cover body part 31 are bonded via the filling member 260. The second bonding part BP2 is a potion having higher adhesive strength than the first bonding part BP1. Accordingly, the adhesive strength between the cover 230 and the housing body 221 is increased, and the locking mechanism 34 mechanically fixing the cover 230 and the housing body 221 can be omitted or simplified. A mechanism having small locking force may be adopted as the locking mechanism 34 in a case where the locking mechanism 34 is simplified. A positioning mechanism, for example, may be adopted in place of the locking mechanism 34.

In the present example, the first bonding part BP1 is a portion where the tip end surface of the sidewall part 24 located between the plurality of housing grooves 22 and the cover body part 31 are bonded via the filling member 60. The second bonding part BP2 is located on an outer side of the housing groove 22 on the outermost side in the width direction. Herein, a flange 29 is provided to the housing body 21. The flange 29 is provided to protrude from each of the pair of side surfaces 21*e* in the width direction. A flange 33 is also provided in a position in the cover 30 corresponding to the flange 29. A portion where two flanges 29 and 33 are bonded via the filling member 60 is the second bonding part BP2. The material of the filling member 60 is the same between the first bonding part BP1 and the second bonding part BP2. Thus, adhesive strength per unit area is the same between the first bonding part BP1 and the second bonding part BP2. However, an area per unit length of a portion where two flanges 29 and 33 face each other along the depth direction is larger than that per unit length of a portion where the sidewall part 24 and the cover body part 31 face each other along the depth direction. Accordingly, the adhesion area of the second bonding part BP2 is larger than the adhesion area of the first bonding part BP1, thus even when the adhesive strength is the same per unit area, the adhesive strength increases by reason that the adhesion area is large.

The adhesive strength per unit area may also be increased by using the other adhesive agent, for example, in the first bonding part BP1 and the second bonding part BP2. The adhesive strength may be increased by a configuration that a concave portion where a fluid adhesive agent can enter and a solidified adhesive agent can be caught is provided to the second bonding part BP2 to increase the adhesive strength.

In manufacturing the wiring member 210, the wiring body with the sheet, the base material B2, a base material B3, the housing body 221, and the cover 230 are prepared as illustrated in FIG. 10. Herein, a length dimension of the base material B3 according to the present example (dimension of the housing body 221 in the width direction) is larger than that of the base material B1 according to the embodiment 1. The base material B3 according to the present example has a length dimension corresponding to a width dimension of a portion of the housing body 221 where the pair of flanges 29 are formed. Then, in the manner similar to the wiring member 10 described above, after the connector is assembled before heating the base materials B2 and B3, the base materials B2 and B3 are heated and melted to be able to be the filling member 260.

Embodiment 4

Figure 11:
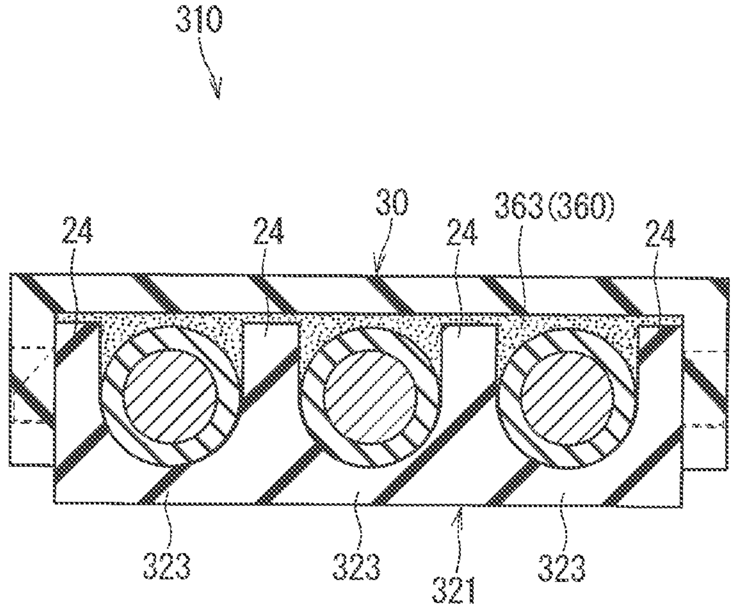
FIG. 11 is a cross-sectional view illustrating a wiring member according to an embodiment 4.
Figure 12:
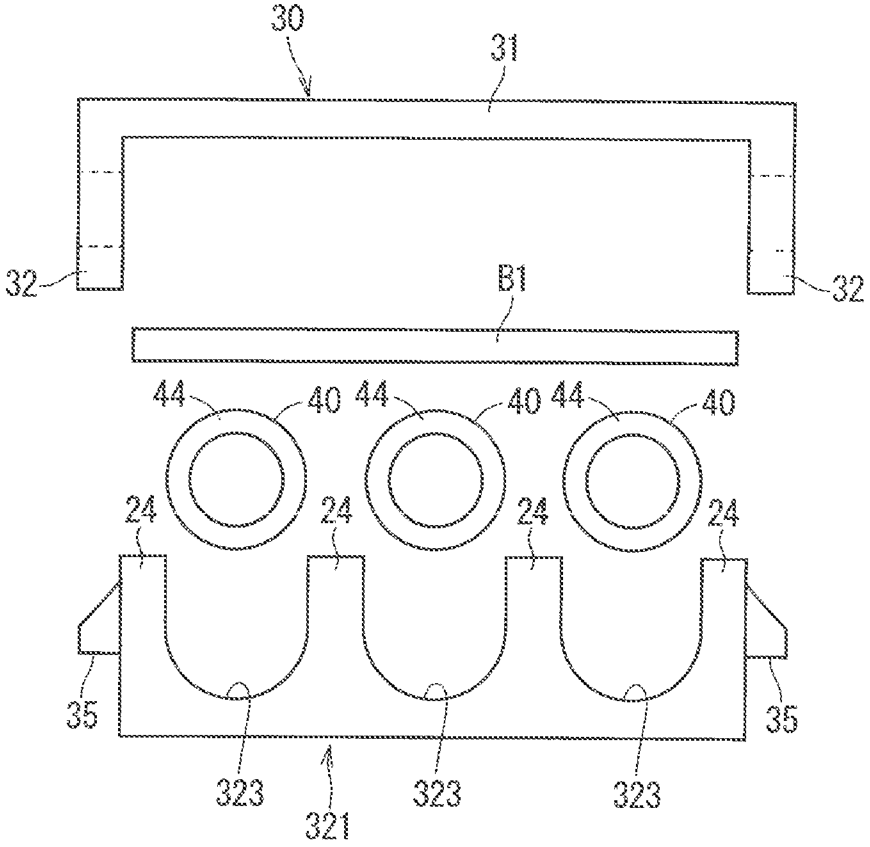
FIG. 12 is a schematic diagram illustrating a manufacture of the wiring member according to the embodiment 4.

A wiring member according to an embodiment 4 is described. FIG. 11 is a cross-sectional view illustrating a wiring member 310 according to the embodiment 4. FIG. 12 is a schematic diagram illustrating a manufacture of the wiring member 310 according to the embodiment 4.

In the present example, there is no resin material constituting the filling member 360 between a bottom wall part 323 and the wire-like transmission member 40 in a water stop part 363. The bottom wall part 323 and the wire-like transmission member 40 are firmly attached to each other in the water stop part 363, thus waterproof can be achieved without the resin material constituting the filling member 360 between the bottom wall part 323 and the wire-like transmission member 40. Accordingly, waterproof can be simply achieved without the resin material constituting the filling member 360 between the bottom wall part 323 and the wire-like transmission member 40.

More specifically, an inner surface of the bottom wall part 323 is formed into a shape corresponding to an outer surface of the wire-like transmission member 40. Herein, the inner surface of the bottom wall part 323 and the outer surface of the wire-like transmission member 40 are formed into a circular shape. The bottom wall part 323 and the wire-like transmission member 40 are firmly attached to each other without intervention of the resin material constituting the filling member 360.

Herein, the inner surface of the bottom wall part 23 and the outer surface of the covering layer 44 are firmly attached to each other. It is also applicable that a rubber plug is put on the wire-like transmission member 40 and the inner surface of the bottom wall part 23 and an outer surface of the rubber plug are firmly attached to each other.

In manufacturing the wiring member 310, a wiring body with a sheet, a housing body 321, and the cover 30 are prepared, and in addition, the base material B2 is omitted but only the base material B1 is prepared as a base material as illustrated in FIG. 12. Then, in the manner similar to the wiring member 10 described above, after the connector is assembled before heating the base material B1, the base material B1 is heated and melted to be able to be the filling member 360.

Modification Example

Figure 13:
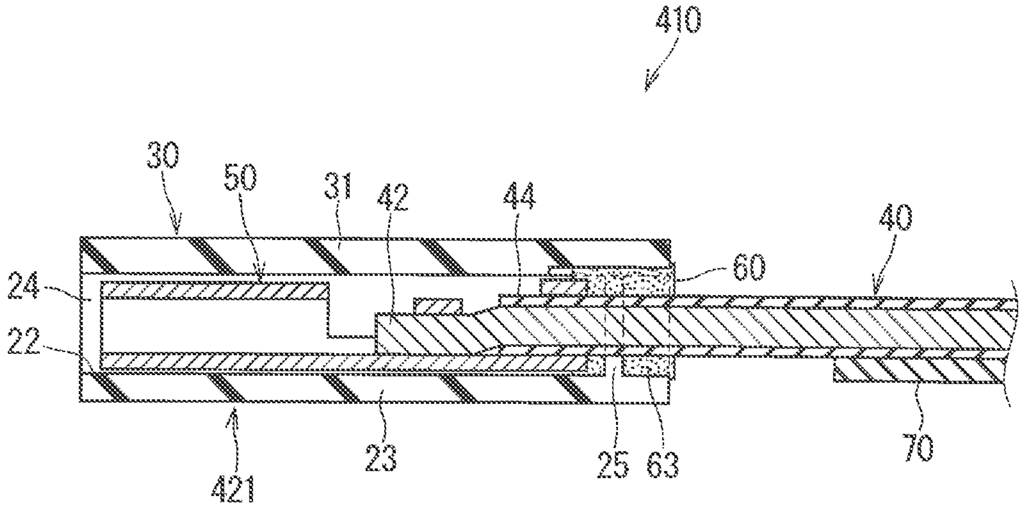
FIG. 13 is a cross-sectional view illustrating a modification example of the wiring member.
Figure 14:
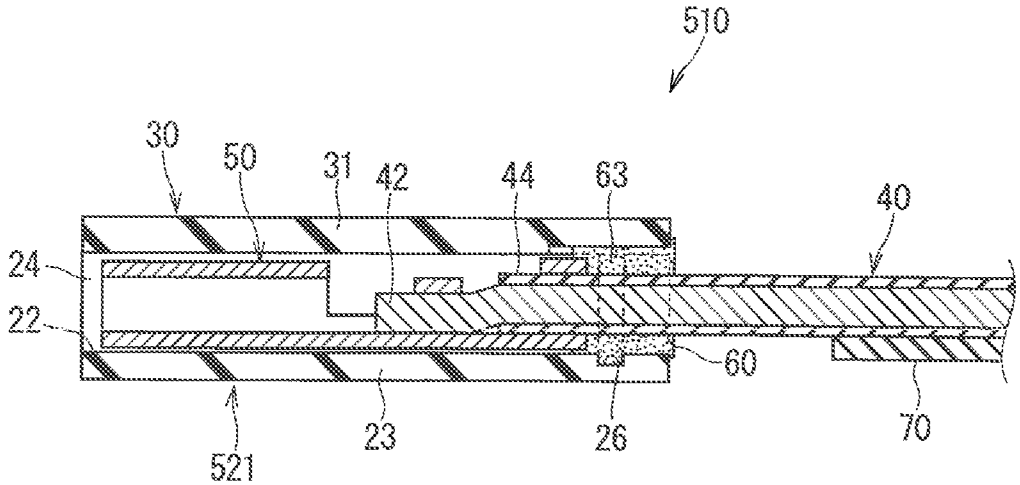
FIG. 14 is a cross-sectional view illustrating a modification example of the wiring member.

FIG. 13 and FIG. 14 are cross-sectional views each illustrating a modification example of the wiring member 10.

In a wiring member 410 illustrated in FIG. 13 and a wiring member 510 illustrated in FIG. 14, gap formation parts 25 and 26 separating the wire-like transmission member 40 and the bottom wall part 23 are provided to the bottom wall part 23. The filling member 60 is provided to a gap formed by the gap formation parts 25 and 26 between the bottom wall part 23 and the wire-like transmission member 40. Accordingly, even when a filling member (for example, the base material B2 described above) is not previously disposed between the bottom wall part 23 and the wire-like transmission member 40, a filling material (for example, the base material B1 described above) which has been heated and melted can reach to fill the gap formed by the gap formation parts 25 and 26 between the bottom wall part 23 and the wire-like transmission member 40.

An example illustrated in FIG. 13 is an example that the gap formation part 25 is a rib 25. In this case, the gap formed by the gap formation part 25 between the bottom wall part 23 and the wire-like transmission member 40 a portion located adjacent to the rib 25 along the depth direction. In the example illustrated in FIG. 13, only one rib 25 is provided, however, two or more ribs 25 may be provided separately from each other in the depth direction. An example illustrated in FIG. 14 is an example that the gap formation part 26 is a groove 26. In this case, the groove 26 itself is the gap formed by the gap formation part 26 between the bottom wall part 23 and the wire-like transmission member 40. It is sufficient that the gap formation parts 25 and 26 form a gap in a position of the covering layer 44 extending from the terminal crimping part 46 in the wire-like transmission member 40. When the gap formation part 25 is the rib 25, it is sufficient that the rib 25 is formed in a position of the covering layer 44 extending from the terminal crimping part 46.

It is sufficient that the gap formation parts 25 and 26 have a configuration that a gap is reliably formed between the wire-like transmission member 40 and the bottom wall part 23 and between the wire-like transmission member 40 and the sidewall part 24. For example, it is sufficient that the rib 25 and the groove 26 are sequentially provided in a circumferential direction in the inner surface of the housing groove 22. That is to say, the rib 25 and the groove 26 reach the tip end portion of one sidewall part 24 from the tip end portion of the other sidewall part 24 via the bottom wall part 23. A height dimension of the rib 25 and a depth dimension of the groove 26 are not particularly limited as long as they are large enough for the flowing filling member 60 to enter, but can be appropriately set. It is sufficient that the gap formation parts 25 and 26 have the configuration that the gap is reliably formed at least between the wire-like transmission member 40 and the bottom wall part 23, and the rib 25 and the groove 26 may be formed in only the bottom wall part 23.

Both the rib 25 and the groove 26 may be provided to one housing body as the gap formation parts. For example, it is also applicable that two ribs 25 are formed separately from each other in the depth direction, and the groove 26 is formed between two ribs 25.

The configurations described in the embodiments and modification examples thereof can be appropriately combined as long as they are not contradictory.

EXPLANATION OF REFERENCE SIGNS

10 wiring member
20 connector housing
21 housing body
21*a* one main surface
21*b* other main surface
21*c* front end surface
21*d* back end surface
21*e* side surface
22 housing groove
23 bottom wall part
24 sidewall part
25 rib (gap formation part)
26 groove (gap formation part)
27 body part
28 cover part
29 flange
30 cover
31 cover body part
32 lateral cover part
33 flange
34 locking mechanism
35 locking part
36 locking receiving part
40 electrical wire (wire-like transmission member)
42 core wire
44 covering layer
46 terminal crimping part
47 core wire crimping part

48 covering crimping part
50 terminal
52 wire barrel
54 insulation barrel
56 other side connection part
60 filling member
62 inner portion
63 water stop part
64 inner portion
65 first outer portion
66 second outer portion
70 sheet
80 heating device
B, B1, B2, B3 base material
BP1 first bonding part
BP2 second bonding part

The invention claimed is:

1. A wiring member, comprising:

a connector housing including at least one housing body, with an opening in one main surface and a housing groove concaved toward another main surface, and a cover attached to the housing body;

a wire-like transmission member including an end portion housed in the housing groove; and a filling member filling the housing groove, wherein the housing body includes a bottom wall part and a sidewall part as wall parts of the housing groove, the cover includes a cover body part overlapped with the one main surface of the housing body to cover the housing groove, and the filling member is also provided between a portion of the one main surface serving as a tip end surface of the sidewall part and the cover body part, wherein the filling member is also provided between the bottom wall part and the wire-like transmission member; and wherein a gap formation part separating the wire-like transmission member and the bottom wall part is provided to the bottom wall part, the filling member is provided in a gap formed by the gap formation part between the bottom wall part and the wire-like transmission member, and wherein the gap formation part is a rib or a groove provided in a part of the bottom wall part where the filing member is filled.

2. The wiring member according to claim 1, wherein a portion of the bottom wall part provided with the filling member is flat in a longitudinal direction of the housing groove.

3. The wiring member according to claim 1, wherein the connector housing includes the plurality of housing bodies, the plurality of housing bodies are stacked on each other, and the filling member is also provided between the housing bodies.

4. The wiring member according to claim 1, further comprising a locking mechanism fixing the housing body and the cover, and the locking mechanism includes a locking part provided to the housing body and a locking receiving part provided to the cover to be locked to the locking part.

5. The wiring member according to claim 1, wherein the filling member is bonded to each of the cover and the housing body to fix the cover and the housing body.

6. The wiring member according to claim 5, wherein provided are a first bonding part and a second bonding part bonding the cover and the housing body via the filling member, the first bonding part is a portion bonding the tip end surface of the sidewall part and the cover body part via the filling member, and the second bonding part has higher bonding strength than the first bonding part.

7. A wiring member, comprising:

a connector housing including at least one housing body, with an opening in one main surface and a housing groove concaved toward another main surface, and a cover attached to the housing body;

a wire-like transmission member including an end portion housed in the housing groove; and a filling member filling the housing groove, wherein the housing body includes a bottom wall part and a sidewall part as wall parts of the housing groove, the cover includes a cover body part overlapped with the one main surface of the housing body to cover the housing groove, the filling member is also provided between a portion of the one main surface serving as a tip end surface of the sidewall part and the cover body part, and wherein an inner surface of the bottom wall part and an outer surface of the wire-like transmission member are formed into shapes corresponding to each other, and the bottom wall part and the wire-like transmission member are firmly attached without intervention of the filling member.

* * * * *